(12) United States Patent
Semke et al.

(10) Patent No.: US 11,035,270 B2
(45) Date of Patent: Jun. 15, 2021

(54) INTERNAL COMBUSTION ENGINE HAVING AN EXHAUST HEAT RECOVERY SYSTEM AS WELL AS A METHOD FOR RECOVERING EXHAUST HEAT

(71) Applicant: VOLKSWAGEN AKTIENGESELLSCHAFT, Wolfsburg (DE)

(72) Inventors: Artur Semke, Wolfsburg (DE); Asmus Carstensen, Osloss (DE); Hardy Naumann, Wolfsburg (DE); André Horn, Braunschweig (DE); Thomas Schulenburg, Isenbüttel (DE); Thomas Maischik, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/899,563

(22) Filed: Jun. 11, 2020

(65) Prior Publication Data
US 2020/0392883 A1     Dec. 17, 2020

(30) Foreign Application Priority Data
Jun. 12, 2019   (DE) ..................... 10 2019 115 909.1

(51) Int. Cl.
*F01N 3/04*     (2006.01)
*F01K 23/06*    (2006.01)
(Continued)

(52) U.S. Cl.
CPC .............. *F01N 3/04* (2013.01); *F01K 23/065* (2013.01); *F01N 3/0205* (2013.01); *F01N 5/02* (2013.01);
(Continued)

(58) Field of Classification Search
CPC ........ F01K 23/065; F01K 23/12; F01K 23/14; F01N 3/04; F01N 3/0205; F01N 5/02;
(Continued)

(56) References Cited

U.S. PATENT DOCUMENTS 5,351,487 A * 10/1994 Abdelmalek ............. F02G 5/00
                                                     60/618
2003/0145583 A1* 8/2003 Tanaka ................ F01N 13/0093
                                                     60/298
(Continued)

FOREIGN PATENT DOCUMENTS

DE     10 2005 024 685 A1    12/2005
DE     10 2010 023 174 A1    12/2011
(Continued)

OTHER PUBLICATIONS

Search report for German Patent Application No. 10 2019 115 909.1, dated Mar. 11, 2020.
(Continued)

*Primary Examiner* — Mark A Laurenzi
*Assistant Examiner* — Mickey H France
(74) *Attorney, Agent, or Firm* — Pearl Cohen Zedek Latzer Baratz LLP

(57) ABSTRACT

An internal combustion engine having at least one combustion chamber, the internal combustion engine being connected via the exhaust thereof with an exhaust system. Disposed in the exhaust system is a heat exchanger of an exhaust heat recovery system, which can be used to transfer the waste heat of the exhaust gas to an operating fluid of the exhaust heat recovery system. Furthermore, the internal combustion engine is couplable to an air-conditioning compressor of an air-conditioning circuit. The exhaust heat recovery system has a further heat exchanger, in which the waste heat of a compressed refrigerant of the air-condition-
(Continued)

ing circuit is transferred to the operating fluid of the exhaust heat recovery system. A method for recovering the exhaust heat from such an internal combustion engine, an operating fluid of the exhaust heat recovery system being heated in a first method step by the waste heat of a compressed refrigerant of the air-conditioning circuit and, in a second method step, by the waste heat of the exhaust gas from the internal combustion engine.

16 Claims, 2 Drawing Sheets

(51) Int. Cl.
    *F01N 3/02*     (2006.01)
    *F01N 5/02*     (2006.01)
    *F02G 1/047*     (2006.01)
    *F02G 1/055*     (2006.01)
    *F02G 5/04*     (2006.01)

(52) U.S. Cl.
    CPC ............ *F02G 1/047* (2013.01); *F02G 1/055* (2013.01); *F02G 5/04* (2013.01); *F01N 2240/02* (2013.01); *F01N 2260/024* (2013.01)

(58) Field of Classification Search
    CPC ........... F01N 2240/02; F01N 2260/024; F02G 1/047; F02G 1/055; F02G 5/04
    USPC ............................ 60/320, 614–616, 618, 620
    See application file for complete search history.

(56) References Cited

U.S. PATENT DOCUMENTS

| | | |
|---|---|---|
| 2005/0262858 A1 | 12/2005 | Inaba et al. |
| 2009/0211253 A1* | 8/2009 | Radcliff .............. F01K 23/065 60/670 |
| 2010/0294217 A1 | 11/2010 | Kasuya et al. |
| 2011/0247351 A1* | 10/2011 | Alston ................. F25B 25/00 62/235.1 |
| 2012/0210713 A1 | 8/2012 | Ernst et al. |
| 2015/0000274 A1 | 1/2015 | Ernst et al. |
| 2015/0047351 A1* | 2/2015 | Ishikawa .................. F02G 5/02 60/615 |
| 2016/0236534 A1* | 8/2016 | Dal Vecchio ............ B60H 3/02 |
| 2017/0082061 A1* | 3/2017 | Mizoguchi .............. F01D 25/00 |
| 2017/0152766 A1 | 6/2017 | Andersson et al. |
| 2017/0306806 A1 | 10/2017 | Zoltan et al. |
| 2017/0335723 A1 | 11/2017 | Rousseau |
| 2018/0257458 A1* | 9/2018 | Gergis ................. B60H 1/3208 |
| 2018/0355765 A1* | 12/2018 | Patel .................... F01K 23/101 |
| 2019/0040764 A1* | 2/2019 | Johansson ............... F01K 23/06 |

FOREIGN PATENT DOCUMENTS

| | | |
|---|---|---|
| DE | 10 2012 000 100 A1 | 7/2012 |
| DE | 10 2014 016 997 A1 | 5/2016 |
| DE | 10 2015 120 865 A1 | 6/2016 |
| DE | 11 2015 004 953 T5 | 8/2017 |
| EP | 3 161 275 B1 | 5/2017 |
| JP | 2005 282 363 A | 10/2005 |
| WO | WO 2012/125107 A1 | 9/2012 |

OTHER PUBLICATIONS

Search report for European Patent Application No. EP 20 17 9402, dated Oct. 20, 2020.

* cited by examiner

INTERNAL COMBUSTION ENGINE HAVING AN EXHAUST HEAT RECOVERY SYSTEM AS WELL AS A METHOD FOR RECOVERING EXHAUST HEAT

CROSS REFERENCE TO RELATED APPLICATION

This application claims priority from German Patent Application No. 10 2019 115 909.1, filed Jun. 12, 2019, which is incorporated herein by reference in its entirety.

FIELD OF THE INVENTION

The present invention relates to an internal combustion engine having an exhaust heat recovery system as well as to a method for recovering exhaust heat, according to the definition of the species set forth in the independent claims.

BACKGROUND OF THE INVENTION

In the development of internal combustion-engine motor vehicles, additional capabilities are always sought for minimizing fuel consumption and enhancing efficiency. Since, in conventional internal combustion engines, a significant portion of the energy is exhausted, unused, through the exhaust gas into the environment, in internal combustion engines, exhaust heat recovery systems are known which can harness at least a portion of the energy contained in the exhaust-gas flow. Provided for this purpose in the exhaust system of the internal combustion engine is a heat exchanger, via which the waste heat from the internal combustion engine is transferred to a steam circuit, the steam circuit driving a turbine or other machines, such as piston expanders or scroll expanders, which are used to harness this energy as mechanical drive power and/or as electrical power. Generally, an exhaust heat recovery system includes four main components: a pump, an evaporator, an expander, and a condenser. The condenser of the exhaust heat recovery system is typically traversed by the flow of cooling water to cool the internal combustion engine. The working medium of the steam circuit of the exhaust heat recovery system is cooled in the condenser. The cooling capacity must thereby be high enough to allow a reliable phase transition from vaporous to liquid and for it to be ensured at all times.

Decisive for the efficiency of the Clausius Rankine process in the exhaust heat recovery system is a largest possible area in the temperature-entropy diagram associated with the process. In the upper region, this area is determined by the maximum media pressure and the maximum temperature. The power of the expander in the exhaust heat recovery system is thus dependent on the energy supply of the waste heat source. In internal combustion engines, a main waste heat source is the exhaust gas from the internal combustion engine.

The power output of the steam cycle process in the exhaust heat recovery system can be enhanced by combining different heat sources and by making the waste heat available from the coolant circuit of the internal combustion engine, in particular in addition to the exhaust gas from other waste heat sources. The power output can be further enhanced when the condensation of the vapor-state medium in the steam cycle process is ensured in the exhaust heat recovery system by a highest possible cooling capacity of the condensation process.

The German Patent Application DE 10 2010 023 174 A1 discusses an exhaust heat recovery system, which utilizes the waste heat from two different waste heat sources, in particular the waste heat from the exhaust gas from the internal combustion engine, the waste heat from an intercooler or the waste heat from the engine cooling. This waste heat is utilized for heating in a steam circuit process in the recovery of exhaust heat.

The German Patent Application DE 10 2014 016 997 A1 describes a method and devices for operating a single-stage or multi-stage machine for producing mechanical work using at least one working circuit having a heat-supplying heat-transfer circuit for using two and/or more heat sources having temperatures of varying levels. In the heat transfer circuit of this working circuit, the preheating, evaporation and superheating of the working fluid cool the heat transfer medium to below the required return-flow temperature of the heat-supplying system, and at least one heat source is utilized that has a temperature higher than the required return-flow temperature in order to again reach the return-flow temperature of the heat circuit in the heat-supplying system. One possible application is derived from using the exhaust waste heat and engine waste heat from internal combustion engines.

The European Patent EP 3 161 275 B1 describes a waste heat recovery device for recovering waste heat generated during operation of an internal combustion engine, the waste heat recovery device including a heat engine. A first coolant supplying device is configured to communicate with a coolant circuit of the cooling system of the internal combustion engine at a position downstream of the internal combustion engine and upstream of a radiator in the cooling system of the internal combustion engine.

However, the drawback of the known approaches is that the maximum cooling-water temperature of the internal combustion engine limits a heating of the transfer medium for the steam circuit of the exhaust heat recovery system. The result is a low temperature level in comparison to the exhaust gas temperature. Therefore, solely the waste heat of the exhaust-gas flow of the internal combustion engine is utilized for mobile applications in motor vehicles.

It is an object of the present invention to further enhance the efficiency of the exhaust heat recovery system and to overcome the disadvantages of the systems known from the related art.

SUMMARY OF THE INVENTION

This objective is achieved in accordance with the present invention by an internal combustion engine having at least one combustion chamber, the internal combustion engine being connected by the exhaust thereof with an exhaust system. Provided in the exhaust system is a heat exchanger of an exhaust heat recovery system that may be used to transfer the waste heat of the exhaust gas to an operating fluid of the exhaust heat recovery system. Furthermore, the internal combustion engine is couplable to an air-conditioning compressor of an air-conditioning circuit. The exhaust heat recovery system has a further heat exchanger, in which the waste heat of a compressed refrigerant of the air-conditioning circuit is transferred to the operating fluid of the exhaust heat recovery system. Additional energy may be introduced into the exhaust heat recovery system by the waste heat of the air-conditioning compressor, respectively of the compressed refrigerant heating the operating fluid of the exhaust heat recovery system. As a function of the compression, the refrigerant may thereby be heated to temperatures significantly higher than the cooling-water temperature of the internal combustion engine, making it possible for the operating fluid to be heated more intensely. Moreover, the power required by the air-conditioner compressor may be reduced or the cooling capacity increased since the compressed refrigerant transfers heat to the operating fluid of the exhaust heat recovery system and thus reaches a lower temperature during expansion than without intermediate cooling.

Advantageous improvements to and non-trivial refinements of the internal combustion engine indicated in the independent claim are rendered possible by the features delineated in the dependent claims.

A preferred embodiment of the present invention provides that the further heat exchanger be disposed in an operating fluid circuit of the exhaust heat recovery system downstream of a pump for the operating fluid and upstream of the heat exchanger, which is traversed by the flow of the exhaust gas from the internal combustion engine. Inputting heat downstream of the pump makes it possible for the pump to deliver a still relatively cool operating fluid, thereby increasing the density of the operating fluid and thus also the efficiency of the delivery pump. Also prevented is a decline in the delivery rate or damage to the pump caused by vapor lock and associated cavitation.

An advantageous specific embodiment of the internal combustion engine provides that an expansion engine, which may drive a motor and/or a generator, be configured in an operating fluid circuit of the exhaust heat recovery system. An expansion engine, in particular a turbine, is able to readily harness the waste heat from the internal combustion engine and the waste heat from the air-conditioning circuit. The expansion engine may thereby be used for mechanically driving an auxiliary unit or the internal combustion engine. Alternatively, the expansion engine may drive a generator that converts the motion of the expansion engine into electrical energy. This electrical energy may be directly used for driving an electrical load or be fed to an electrical system of a motor vehicle, respectively be temporarily stored in a battery.

It is thereby especially preferred that the expansion engine be couplable via a power split device optionally to the internal combustion engine and/or to an electric drive motor or generator. Alternatively, power may thereby be transmitted to the internal combustion engine, in order to transmit an additional drive torque to the crankshaft and thus increase the power of the internal combustion engine or minimize consumption. In operating situations that do not entail a direct power requirement, the energy of the expansion engine may be converted by the generator into electrical energy and be temporarily stored in a battery of the vehicle electrical system. This makes it possible to reduce the load on the generator and/or accelerate the charging of the battery. Moreover, electrical loads may be fed directly, thus without intermediately storing the electrical current in the battery, making it possible to reduce the drive power that the generator requires. The power efficiency of the internal combustion engine may thereby be enhanced.

An advantageous specific embodiment of the present invention provides that a condenser be provided in the operating fluid circuit of the exhaust heat recovery system downstream of the expansion engine and upstream of a pump for the operating fluid. A condenser may be used to ensure that the operating fluid, after flowing through the expansion engine, is reliably returned to the liquid state of aggregation thereof.

An advantageous enhancement of the exhaust heat recovery system provides that the condenser have a refrigerant inlet and a refrigerant return, which communicate with a cooling-water circuit of the internal combustion engine. By connecting the condenser to the cooling-water system of the internal combustion engine, an efficient cooling of the operating fluid may be readily achieved without an additional coolant circuit, thereby ensuring a conversion to the liquid state of aggregation. The condenser is preferably configured in the cooling-water circuit of the internal combustion engine downstream of a cooler or upstream of the internal combustion engine, to enable preferably cool cooling water to flow through the condenser.

An advantageous further embodiment of the present invention provides that a reservoir for the operating fluid be configured downstream of the condenser and upstream of the pump. A reservoir may be used to provide a stabilizing volume in which the operating fluid is able to collect and stabilize after flowing through the condenser. This makes possible a further cooling of the operating fluid.

A preferred specific embodiment of the present invention provides that the operating fluid of the exhaust heat recovery system be a liquid, organic working medium, in particular an alcohol, especially an ethanol or an ethanol-water mixture. An organic working medium may have a lower boiling point than water.

Another preferred embodiment of the present invention provides that the air-conditioning circuit have an air-conditioning compressor and a refrigerant condenser, the further heat exchanger being traversed by the flow of the refrigerant, which is compressed by the air-conditioning compressor, before the compressed refrigerant enters the refrigerant condenser. In this way, the heat of the hot, compressed refrigerant is transferred to the operating fluid of the exhaust heat recovery system. The desired cooling of the refrigerant may thereby be used not to exhaust this waste heat to the environment, but in the exhaust heat recovery system.

An advantageous embodiment of the air-conditioning circuit provides that the air-conditioning circuit have an expansion tank downstream of the refrigerant condenser and upstream of a refrigerant evaporator.

A preferred specific embodiment of the present invention provides that the refrigerant of the air-conditioning circuit be carbon dioxide. As a refrigerant for air-conditioning systems, carbon dioxide is advantageous since it is non-toxic and non-combustible. However, carbon dioxide requires a higher compression of the refrigerant, thereby increasing the temperatures of the compressed refrigerant. These higher temperatures lead to a higher temperature gradient between the refrigerant and the operating fluid of the exhaust heat recovery system, thereby enhancing the heat transfer and thus allowing more heat to be introduced into the exhaust heat recovery system. Thus, the waste heat from the air-conditioning circuit may be utilized very efficiently, particularly in the case of an air-conditioning system having carbon dioxide as refrigerant.

Alternatively, it is advantageously provided that the refrigerant of the air-conditioning circuit be R1234yf. Also, in the case of known refrigerants, such as R1234yf, temperatures of more than 120° C. are reached following the compression in the air-conditioning compressor, whereby, in the case of these refrigerants as well, a sufficient temperature gradient is obtained with respect to the operating fluid of the exhaust heat recovery system.

The present invention provides a method for recovering the exhaust-gas heat from such an internal combustion engine, an operating fluid of the exhaust heat recovery system being heated in a first method step by the waste heat of a compressed refrigerant of the air-conditioning circuit and, in a second method step, by the waste heat of the exhaust gas from the internal combustion engine. Such a method makes it possible for the waste heat from the air-conditioning circuit to be utilized for feeding additional energy into the exhaust heat recovery system. In the air-conditioning circuit, temperatures are thereby reached that are above the temperature of the cooling-water circuit of the internal combustion engine, promoting the evaporation of the operating fluid.

An advantageous variant of the method provides that the refrigerant be compressed to an operating pressure of at least 20 bar, preferably of at least 100 bar. The greater the compression of the refrigerant, the higher are the temperatures reached subsequently to the compression. Particularly when carbon dioxide is used as refrigerant, high compression pressures of 100 bar and more are necessary in order to realize a sufficient cooling capacity for the air conditioning system. Especially in the case of refrigerants, which are very highly compressed and thus reach very high temperatures, the transfer of the waste heat to the operating fluid of the exhaust heat recovery system is advantageous.

Another advantageous embodiment of the method provides that the waste heat of the compressed refrigerant be transferred downstream of a pump to the operating fluid of the exhaust heat recovery system. Immediately downstream of the pump of the air-conditioning circuit, the refrigerant reaches the highest compression thereof and, consequently, the highest temperature thereof. Thus, here is the greatest potential for harnessing this waste heat and for cooling the compressed refrigerant before it is passed through the condenser and the evaporator and expanded.

A preferred embodiment of the method provides that an air-conditioning compressor of the air-conditioning circuit be driven by a traction means, in particular a chain or a belt of a rotating shaft of the internal combustion engine. A traction means makes possible a simple driving of the air-conditioning compressor by the internal combustion engine. There is no need for the mechanical energy to be additionally converted into electrical energy and back, making it possible to minimize the power loss. Alternatively, the air-conditioning compressor may also be electrically driven, it being possible for the electric current to be provided by the expansion engine, in particular in the exhaust heat recovery system and in a generator connected thereto.

It is thereby especially preferred that a switchable coupling, in particular a magnetic coupling be provided between the belt drive and the air-conditioning compressor, the air-conditioning compressor being driven by the rotating shaft of the internal combustion engine in a first operating state of the switchable coupling, and being uncoupled from the rotating shaft of the internal combustion engine in a second operating state. This makes it possible for the air-conditioning compressor to be decoupled from the drivetrain and for the drive power to be reduced when the air-conditioning compressor is switched off.

Unless indicated otherwise in the individual case, the various specific embodiments of the present invention mentioned in this Application may be advantageously combined with one another.

BRIEF DESCRIPTION OF THE DRAWINGS

The present invention will be explained in the following in exemplary embodiments with reference to the accompanying drawings. The same reference numerals in the various figures thereby denote identical components or components having the same function, where.

DETAILED DESCRIPTION OF THE INVENTION

Figure 1:
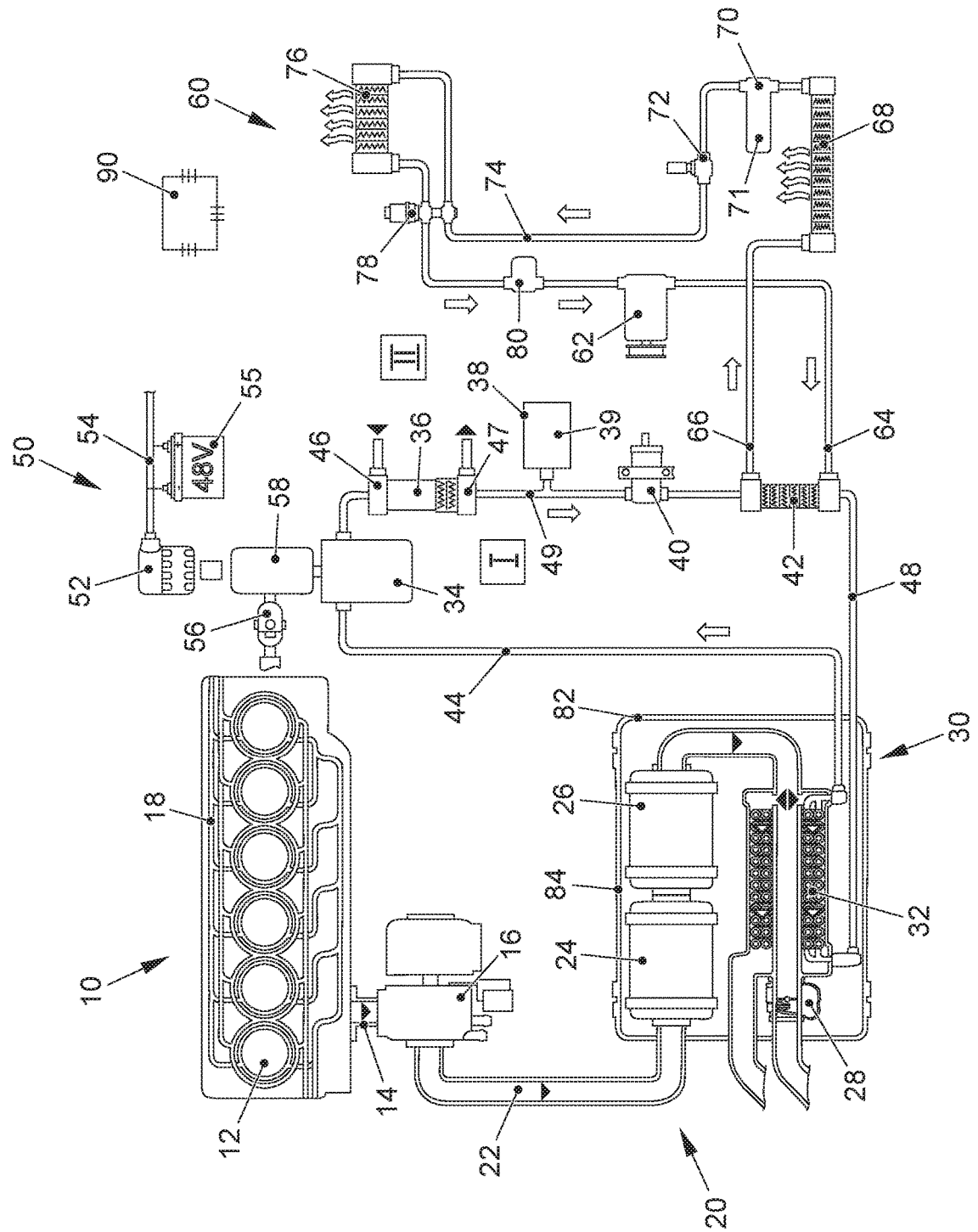
FIG. 1 shows a preferred exemplary embodiment of an internal combustion engine having an exhaust system, an exhaust heat recovery system, as well as an air-conditioning circuit.

FIG. 1 shows an internal combustion engine 10 having a combustion chamber 12, which is provided for driving a motor vehicle. In FIG. 1, internal combustion engine 10 is in the form of a six-cylinder in-line engine. Alternatively possible, however, are also other variants, preferably having 2-12 cylinders. Alternatively, internal combustion engine 10 may also be realized as a V engine or a boxer engine. Internal combustion engine 10 has a coolant circuit 18, via which the engine block of internal combustion engine 10 is cooled to dissipate the waste heat from internal combustion engine 10. Combustion engine 10 is coupled via exhaust 14 thereof to an exhaust system 20. Exhaust system 20 includes an exhaust duct 22, in which are disposed a turbine of an exhaust-gas turbocharger 16 in the direction of flow of an exhaust gas from internal combustion engine 10 through exhaust duct 22, and, downstream of the turbine of exhaust-gas turbocharger 16, a plurality of exhaust gas aftertreatment components 24, 26, as well as a heat exchanger 32 of an exhaust heat recovery system 30. A preferred specific embodiment of the present invention provides that internal combustion engine 10 be in the form of a compression-ignition diesel engine, and that exhaust gas aftertreatment components 24, 26 include an oxidation catalytic converter, an NOx storage catalytic converter, a particulate filter, and/or a catalytic converter for selectively catalytically reducing nitrogen oxides.

Alternatively or additionally, the exhaust system, in particular in the case of an Otto engine, may also include a three-way catalytic converter or a four-way catalytic converter. Provided downstream of heat exchanger 32 is an exhaust-gas flap 28, which may be used to at least partially seal exhaust duct 22 in order to increase the exhaust gas back pressure. As exhaust heat recovery unit 84, exhaust gas aftertreatment components 24, 26 and heat exchanger 32 may also be configured in a shared housing 82 to simplify the installation of exhaust system 20. Exhaust-gas flap 28 may likewise be integrated in this exhaust heat recovery unit 84.

In addition to heat exchanger 32, which also serves as an evaporator 32 for an operating fluid 39 of exhaust heat recovery system 30, exhaust heat recovery system 30 includes an expansion engine 34, a condenser 36, a pump 40, as well as a further heat exchanger 42 that is used to cool a compressed refrigerant 71 of an air-conditioning circuit 60. Exhaust heat recovery system 30 also includes a reservoir 38 for operating fluid 39, in particular an organic working medium, preferably alcohol or an alcohol-water mixture, especially ethanol or an ethanol-water mixture. Reservoir 38 is connected via a power line to pump 40, in which operating fluid 39 is compressed. The compressed working medium is fed to further heat exchanger 42 where it absorbs the waste heat of a pressurized refrigerant 71 and feeds it via a feed line 48 to heat exchanger 32. In heat exchanger 32, the waste heat of the exhaust-gas flow of internal combustion engine 10 is transferred to the operating fluid, and the operating fluid is converted into the gaseous state of aggregation. The thereby produced steam is fed via a steam line 44 to expansion engine 34, which is operatively connected to a hybrid module 50. By way of a power split device 58, expansion engine 34 may be connected optionally to internal combustion engine 10 via a mechanical drive shaft 56 or to a motor/generator 52 for generating electric current. Motor/generator 52 is connected to an electrical system 54 of a motor vehicle and is able to temporarily store the electrical energy in a battery 55.

Disposed downstream of expansion engine 34 in exhaust heat recovery system 30 is a condenser 36, which has a refrigerant inlet 46 and a refrigerant return 47 and is connected to cooling-water circuit 18 of internal combustion engine 10. In condenser 36, the operating fluid of exhaust heat recovery system 30 is returned to the liquid state of aggregation before it is fed back to pump 40 via a return line 49.

Internal combustion engine 10 is couplable via a traction means, in particular a chain or a belt, to an air-conditioning compressor 62 of air-conditioning circuit 60. Besides air-conditioning compressor 62, air-conditioning circuit 60 includes further heat exchanger 42, a refrigerant condenser 68, an expansion tank 70 and a refrigerant evaporator 76. Air-conditioning compressor 62 is connected via a line 64 to further heat exchanger 42, where refrigerant 71, which is compressed by air-conditioning compressor 62, transfers the heat thereof to operating fluid 39 of exhaust heat recovery system 30. Further heat exchanger 42 is connected via another line 66 to a refrigerant condenser 68 of air-conditioning circuit 60. Provided downstream of refrigerant condenser 68 is an expansion tank 70 in which refrigerant 71 is stored. Provided downstream of expansion tank 70 is a high pressure valve 72. High pressure valve 72 is connected via a line 74 to a refrigerant evaporator 76 in which refrigerant 71 is expanded and evaporated, energy being extracted therefrom, causing it to cool considerably. This cold is utilized for air conditioning a passenger compartment of a motor vehicle. Furthermore, a valve 78 and an evaporation volume 80 are provided in the air-conditioning circuit, in order to collect the expanded refrigerant again and feed it to air-conditioning compressor 62.

Air-conditioning compressor 62 compresses refrigerant 71 to a pressure of at least 20 bar, preferably at least 100 bar, refrigerant 71, in particular carbon dioxide, heating up considerably. This heat is transferred via further heat exchanger 42 to operating fluid 39 of exhaust heat recovery system 30, the compressed refrigerant being cooled at the same time.

Internal combustion engine 10 is operatively connected to a control unit 90, via which air-conditioning circuit 60 as well as exhaust heat recovery system 30 are controlled.

Figure 2:
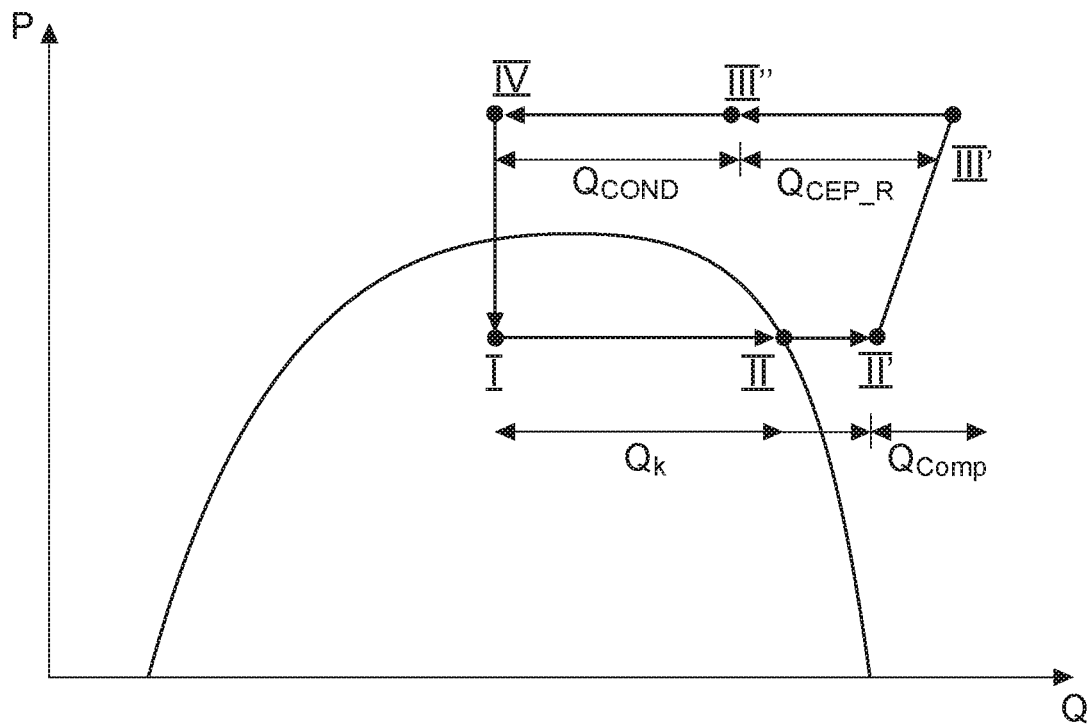
FIG. 2 is a diagram of the pressure as a function of the enthalpy in the air-conditioning circuit in the case of an internal combustion engine according to the present invention.

FIG. 2 shows a pressure-enthalpy diagram that illustrates the processes in air-conditioning circuit 60.

Figure 3:
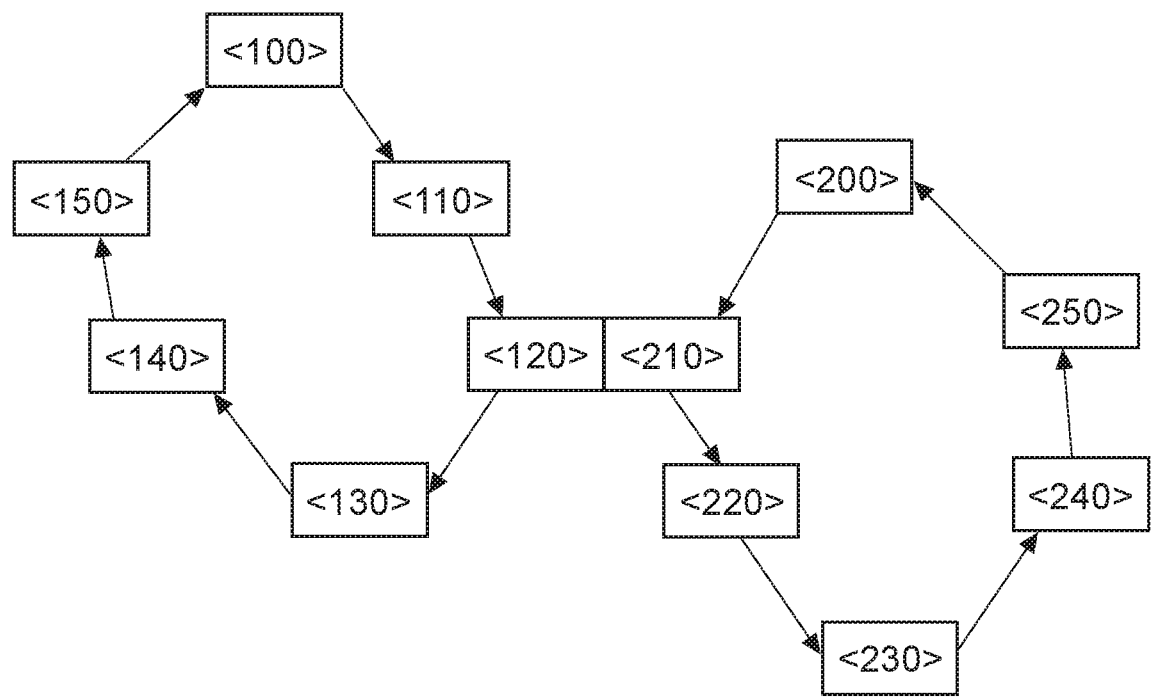
FIG. 3 is a flow chart for implementing a method according to the present invention for recovering the exhaust-gas heat from an internal combustion engine.

FIG. 3 shows a flow chart for implementing a method according to the present invention for recovering exhaust heat. In a first method step <100>, air-conditioning compressor 62 is operated, and refrigerant 71 is compressed. In a method step <110>, compressed refrigerant 71 is fed to further heat exchanger 42. In a method step <120>, compressed refrigerant 71 is cooled by operating fluid 39 of exhaust heat recovery system 30 and subsequently fed to refrigerant condenser 68. Refrigerant 71 is expanded in a method step <130> and evaporated in refrigerant evaporator 76 in a method step <140>. Refrigerant 71 thereby cools and transfers this cold to an air flow that is fed to the passenger compartment of the motor vehicle. In a method step <150>, the expanded refrigerant is collected again and fed to air-conditioning compressor 62.

In a method step <200>, operating fluid 39 of exhaust heat recovery system 30 is delivered from reservoir 38 into further heat exchanger 42. There, in a method step <210>, hot, compressed refrigerant 71 transfers the heat thereof to colder operating fluid 39, so that energy is fed to exhaust heat recovery system 30 and extracted from air-conditioning circuit 60. Method steps <120> and <210> are thereby always executed simultaneously. Heated operating fluid 39 is fed to heat exchanger 32, where it is heated further by the exhaust-gas flow and evaporates in a method step <220>. Vapor-state operating fluid 39 is fed via steam line 44 to expansion engine 34 and drives it in a method step <230>. After flowing through expansion engine 34, operating fluid 39 is fed to condenser 36, it being cooled in a method step <240> and converted again from the gaseous state of aggregation into the liquid state of aggregation. In a method step <250>, the cooled operating fluid is collected and fed to pump 40 again, whereby the circuit of the exhaust heat recovery system closes.

By additionally transferring the waste heat of compressed refrigerant 71 to operating fluid 39 of exhaust heat recovery system 30, the efficiency of internal combustion engine 10 may be enhanced since the dissipated heat may be utilized, and less energy needs to be provided to drive the air-conditioning compressor by combusting fuel.

LIST OF REFERENCE NUMERALS 10 internal combustion engine
12 combustion chamber
14 exhaust
16 exhaust-gas turbocharger
18 turbine
20 exhaust system
22 exhaust duct
24 first exhaust gas aftertreatment component
26 second exhaust gas aftertreatment component
28 exhaust-gas flap
30 exhaust heat recovery system
32 heat exchanger/evaporator
34 expansion engine
36 condenser
38 reservoir
39 operating fluid WHR (waste heat recovery) system
40 pump
42 heat exchanger/air-conditioning condenser
44 steam line
46 refrigerant inlet
47 refrigerant return
48 feed line
49 return line
50 hybrid module
52 motor/generator
54 vehicle electrical system
55 battery
56 mechanical drive
58 power split device
60 air-conditioning circuit
62 air-conditioning compressor
64 line
66 further line
68 refrigerant condenser 70 expansion tank
71 refrigerant
72 high pressure valve
74 line
76 refrigerant evaporator
78 valve
80 evaporation
82 housing
84 exhaust gas aftertreatment unit
90 control unit

The invention claimed is:

1. An exhaust system and an exhaust heat recovery system of an internal combustion engine comprising at least one combustion chamber,
   wherein the exhaust system comprises a first heat exchanger configured to transfer a waste heat of an exhaust gas from the internal combustion engine to an operating fluid of the exhaust heat recovery system,
   wherein the exhaust heat recovery system has a second heat exchanger, in which a waste heat of a compressed refrigerant of an air-conditioning circuit can be transferred to the operating fluid of the exhaust heat recovery system, and
   wherein the air-conditioning circuit has an air-conditioning compressor and a refrigerant condenser, the second heat exchanger being traversed by the flow of the refrigerant, which is compressed by the air-conditioning compressor, before the compressed refrigerant enters the refrigerant condenser.

2. The exhaust system and the exhaust heat recovery system as recited in claim 1, the exhaust heat recovery system further comprising a pump for the operating fluid, wherein the second heat exchanger is disposed in the operating fluid circuit downstream of the pump and upstream of the first heat exchanger, wherein the second heat exchanger is traversed by the flow of the exhaust gas from the internal combustion engine.

3. The exhaust system and the exhaust heat recovery system as recited in claim 1, wherein the exhaust heat recovery system further comprises an expansion engine in the operating fluid circuit, and the expansion engine is configured to drive a motor and/or a generator.

4. The exhaust system and the exhaust heat recovery system as recited in claim 3, wherein the expansion engine is couplable via a power split device optionally to the internal combustion engine and/or to an electric drive motor or generator.

5. The exhaust system and the exhaust heat recovery system as recited in claim 3, wherein the exhaust heat recovery system further comprises a pump for the operating fluid, and a condenser configured in the operating fluid circuit downstream of the expansion engine and upstream of the pump.

6. The exhaust system and the exhaust heat recovery system as recited in claim 5, wherein the condenser has a refrigerant inlet and a refrigerant return, which communicate with a cooling-water circuit of the internal combustion engine.

7. The exhaust system and the exhaust heat recovery system as recited in claim 5, wherein a reservoir for the operating fluid is configured downstream of the condenser and upstream of the pump.

8. The exhaust system and the exhaust heat recovery system as recited in claim 1, wherein the operating fluid of the exhaust heat recovery system is an alcohol.

9. The exhaust system and the exhaust heat recovery system as recited in claim 1, wherein, the air-conditioning circuit includes an expansion tank downstream of a refrigerant condenser and upstream of a refrigerant evaporator.

10. The exhaust system and the exhaust heat recovery system as recited in claim 1, wherein the refrigerant of the air-conditioning circuit is carbon dioxide.

11. A method for recovering exhaust heat from an internal combustion engine comprising at least one combustion chamber, wherein the internal combustion engine is connected to an exhaust system and an exhaust heat recovery system of the internal combustion engine,
   wherein the exhaust system comprises a first heat exchanger configured to transfer a waste heat of an exhaust gas from the internal combustion engine to an operating fluid of the exhaust heat recovery system,
   wherein the exhaust heat recovery system has a second heat exchanger, in which a waste heat of a compressed refrigerant of an air-conditioning circuit can be transferred to the operating fluid of the exhaust heat recovery system,
   wherein the air-conditioning circuit has an air-conditioning compressor and a refrigerant condenser, the second heat exchanger being traversed by the flow of the refrigerant, which is compressed by the air-conditioning compressor, before the compressed refrigerant enters the refrigerant condenser, the method comprising:
   heating an operating fluid of an exhaust heat recovery system by a waste heat of a compressed refrigerant of the air-conditioning circuit and
   heating the operating fluid by a waste heat of exhaust gas from the internal combustion engine.

12. The method as recited in claim 11, further comprising compressing the refrigerant to an operating pressure of at least 20 bar.

13. The method as recited in claim 11, further comprising transferring the waste heat of the compressed refrigerant downstream of a pump to the operating fluid of the exhaust heat recovery system.

14. The method as recited in claim 11, further comprising driving an air-conditioning compressor of the air-conditioning circuit by a traction means.

15. The method as recited in claim 11, further comprising compressing the refrigerant to an operating pressure of at least 100 bar.

16. The method as recited in claim 14, wherein the traction means includes a chain or a belt of a rotating shaft of the internal combustion engine.

* * * * *